United States Patent [19]

Schenck

[11] 4,425,686
[45] Jan. 17, 1984

[54] TELESCOPING FASTENER

[76] Inventor: Alexander W. Schenck, 2991 Chapshire Dr., SE., Grand Rapids, Mich. 49506

[21] Appl. No.: 157,888

[22] Filed: Jun. 9, 1980

[51] Int. Cl.³ .............................................. A44B 17/00
[52] U.S. Cl. ......................................... 24/604; 24/662
[58] Field of Search ................. 24/213 R, 216, 217 R, 24/217 W, 218, 219, 220, 214

[56] References Cited

U.S. PATENT DOCUMENTS

| | | | |
|---|---|---|---|
| 373,797 | 11/1887 | Carpenter | 24/217 |
| 428,063 | 5/1890 | Boda | 24/217 X |
| 1,149,141 | 8/1915 | Hook | 24/218 X |
| 2,037,678 | 4/1936 | Churchill | 24/216 |
| 2,065,325 | 12/1936 | Calhoun | 24/213 R |
| 3,086,803 | 4/1963 | Wilson | 24/217 UX |
| 3,251,260 | 5/1966 | Serdechny | 24/216 X |
| 3,426,385 | 2/1969 | Gutshall | 24/217 X |
| 3,561,075 | 2/1971 | Selinko | 24/217 |
| 3,741,594 | 6/1973 | Ostling | 24/217 X |
| 4,108,560 | 8/1978 | Mindgue | 403/33 |

FOREIGN PATENT DOCUMENTS 473263 2/1929 Fed. Rep. of Germany ........ 24/217
11182 11/1895 Switzerland ........................... 24/217

Primary Examiner—Thomas J. Holko
Attorney, Agent, or Firm—Miller, Morriss & Pappas

[57] ABSTRACT

A telescoping fastener which is concealed upon the interconnection of two separate structures or elements is described. A male element is fastened as by a screw extension to one panel and a recess is provided in the other structural element or panel into which the male element is insertable to form the concealed self-locking joint. In the recess is positioned a cage-like female element which is centered on the axis of the recess as by a threaded member, such as a screw. The male element is pressed axially into the female portion and is frictionally gripped by selected parts of the cage impinging against the male portion at entry. This secures the two elements or portions in prevention of axial withdrawal and centers or stabilizes the male element against wobble or float. Where the cage requires strengthening, the strength is achieved by extending the head of the screw for the female element so that it buttresses the caging and may telescopically receive the male element where the male element is tubular.

6 Claims, 10 Drawing Figures

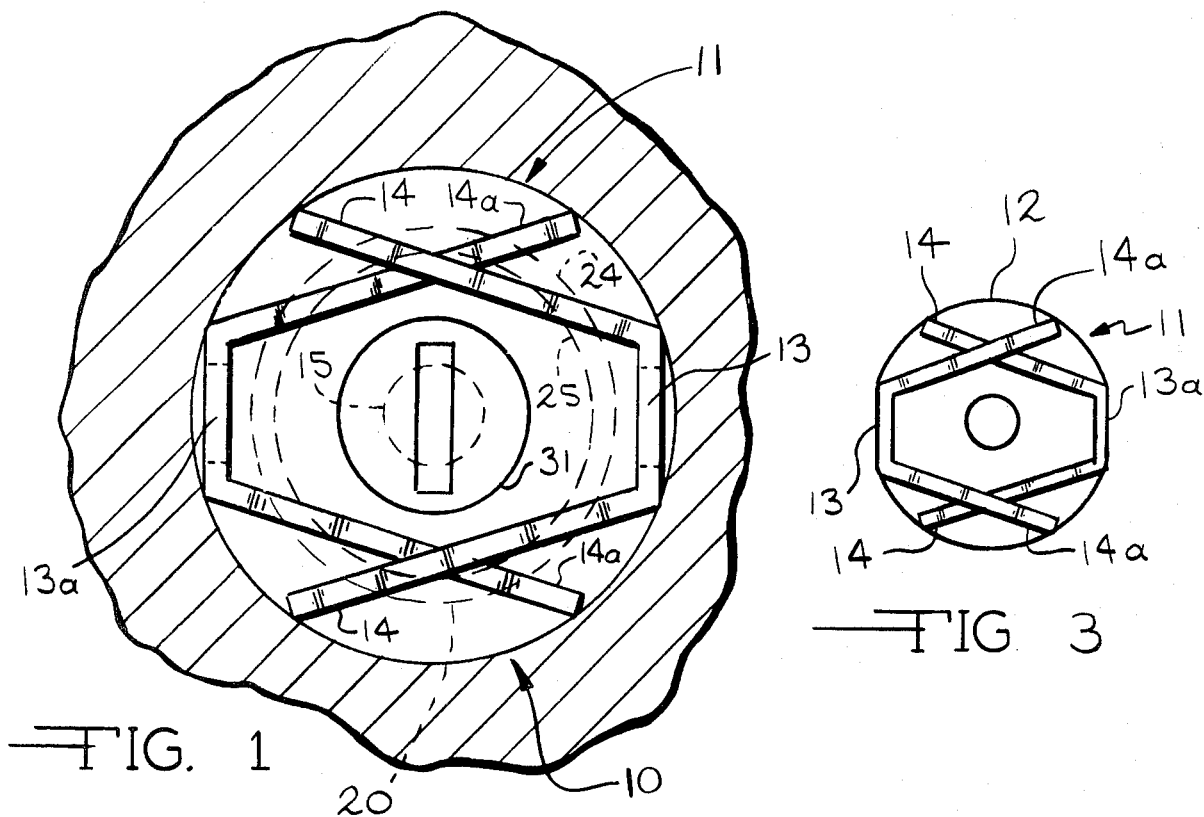
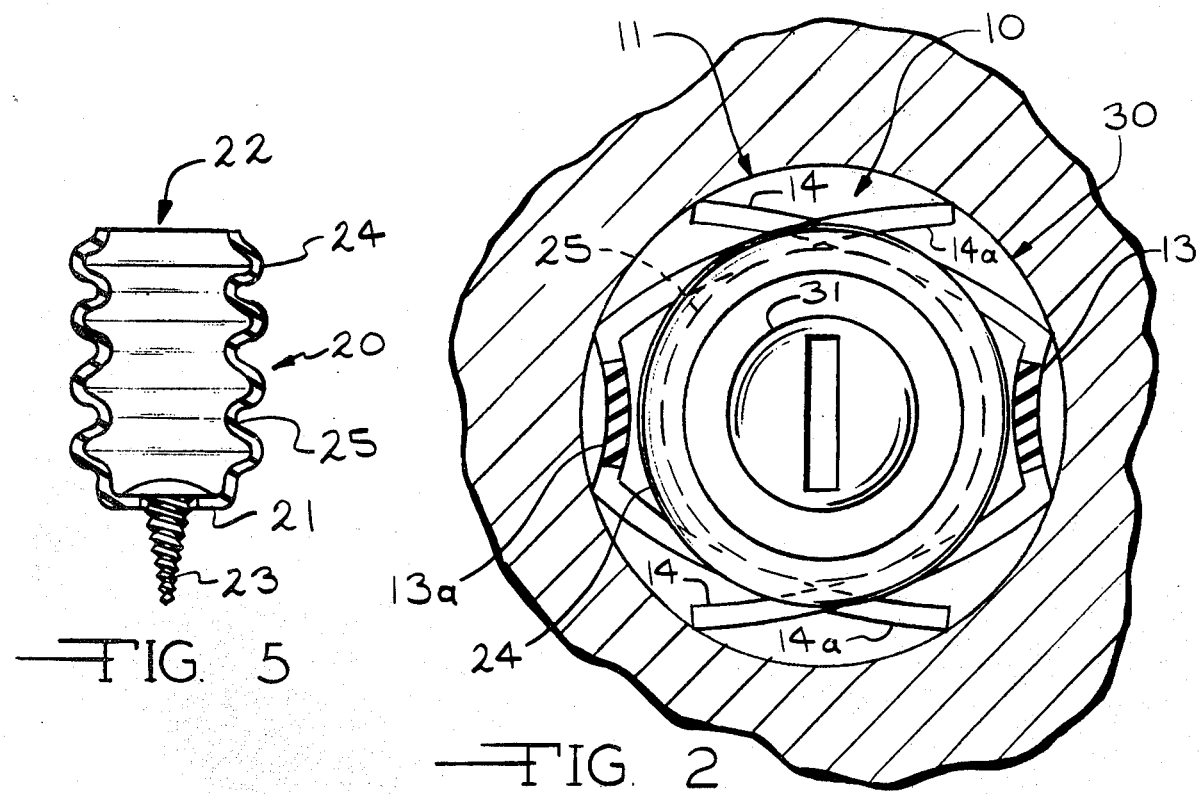

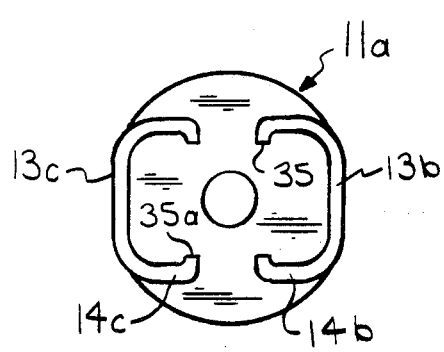 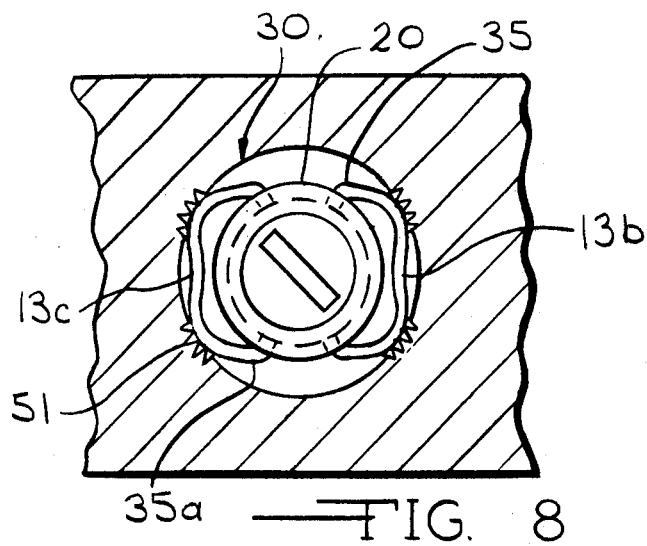 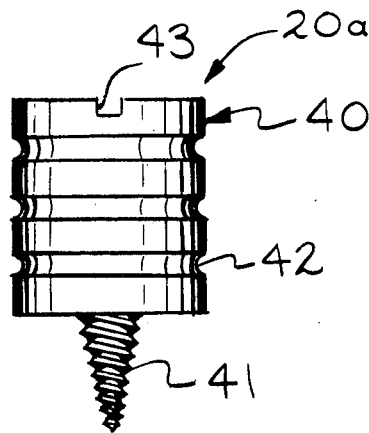 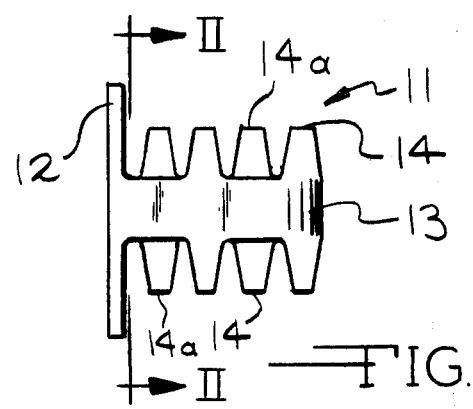 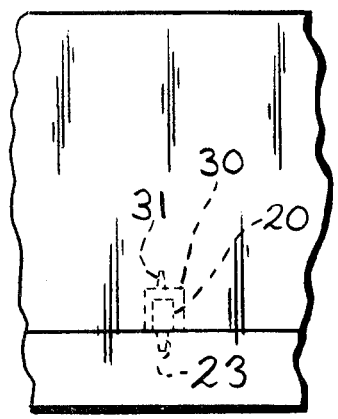 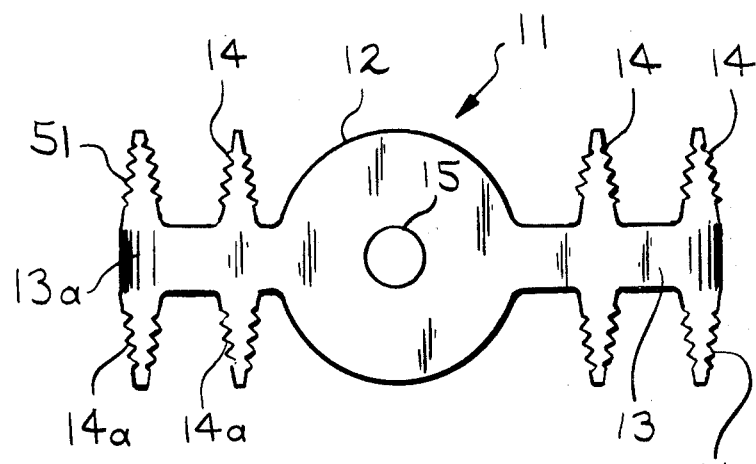

TELESCOPING FASTENER

BACKGROUND OF THE INVENTION

This invention relates to fasteners for joining a pair of panels or structural elements. This is the type of fastener which consists of two parts with one part being secured to one panel and a second part being secured to the other panel. When the fasteners have been secured, the panels are pushed together and the parts interlock forming a concealed, self-locking joint which results from interengagement of the fasteners as the panels are pushed together. Fasteners of this general type have been known and used for many years. They have not been satisfactory because, unless they are of the complex and expensive type or are too large to be effectively concealed, they have the characteristic of becoming loosened by rocking or twisting of the panels. Once this type of deterioration of the joint begins, total failure of the joint can be expected to follow quite rapidly. This type of failure occurs because the fasteners, while effecting a positive lock against the fasteners being pulled apart, do not provide sufficient positive resistance to side or lateral movement because they can rock sideways. Even though this rocking motion is very slight, it quickly results in loosening of the fastener, enlargement of the openings in which the fastener is seated and distortion of the fastener which ultimately results in failure.

BRIEF DESCRIPTION OF THE INVENTION

The fastener of this invention, when the two portions of the fastener are snapped together, provides positive support for the male portion by the female portion preventing lateral rocking or sideways movement between the two pieces of the fastener. This has been accomplished by means of interengaging fingers or protuberances on the female portion of the fastener which positively engage the male portion and by reason of the interference fit, the arms which support the fingers of the female portion are forced against the sides of the opening into which it is seated, thus stiffening the fastener sufficiently to provide the positive grip even though the fastener is manufactured of a relatively thin sheet metal material. Further, the female portion of the fastener is designed to be manufactured by high speed machinery, such as an eyelet machine or four-slide machine. The invention contemplates not only utilizing a solid screw type male portion for the fastener but also such a male portion which also can be made on an eyelet machine or a cold header with a minimum of manufacturing steps.

Simply stated, the invention is a fastener for interconnecting a pair of elements, such as panels, and where the fastener has a male portion and a female portion, the female portion being insertable in a recess within one of the panel elements, and the male part secured to and projecting from another panel element and sized to enter the female portion for frictional engagement and interlock within the recess of the first mentioned panel. The female element includes threaded means for attaching it axially in the recess and so that it sockets the male element on insertion and frictionally holds the male element against wobble and displacement. The socket may be formed with plural upstanding arms and the arms may each include a plurality of protrusions which engage the male portion on entry in a radial application of force normal to the axis of the male portion and for holding the male and female portions together.

BRIEF DESCRIPTION OF THE DRAWINGS

FIG. 1 is an end view of the female portion of the fastener installed in a recess in one of the panels.

FIG. 2 is a sectional view of an assembled joint utilizing this invention taken through the joint at a point which is indicated on the female portion of the fastener by the cutting plane II—II of FIG. 4.

FIG. 3 is an end view of the female portion of the fastener illustrated in FIG. 1.

FIG. 4 is a side elevation view of the female portion of the fastener illustrated in FIG. 3.

FIG. 5 is a central, sectional view of the male portion of the fastener illustrated in FIG. 2.

FIG. 6 is a fragmentary view of a joint between two panels illustrating the connected fastener hidden within the joint.

FIG. 7 is an end view of the female portion of a modified form of the fastener.

FIG. 8 is an end view of the fastener illustrated in FIG. 7 installed in a recess.

FIG. 9 is a side elevation view of a modified form of the male portion of the fastener.

FIG. 10 is a flat pattern for the female portion of the fastener.

DESCRIPTION OF THE PREFERRED EMBODIMENT

The numeral 10 refers to a two-part fastener having a female portion 11 best seen in FIGS. 1, 3 and 4 and a male portion 20 best seen in FIGS. 2 and 5. The male portion 20 is generally tubular and has a base closing one end and the selected fit is achieved by providing grooves in the form of a plurality of circumferential channels, the channels being spaced lengthwise of the portion 20. The fastener portion 11 consists of a base or web 12 and a pair of diametrically positioned arms 13 and 13a which are generally parallel to each other and extend at a right angle from the base 12. Each arm has a pair of fingers or protrusions projecting from each of its side edges. Thus, the arm 13 has a pair of fingers or protrusions 14 and the arm 13a has a pair of fingers 14a. The fingers are so positioned and spaced lengthwise of the arms that the fingers of one arm seat between the fingers of the other arm. The length of the fingers or protrusions is such that when the fastener portion 11 is inserted into a panel recess 30 having a diameter such that it can be inserted slidably therein, the ends of the fingers 14 and 14a contact the walls of the opening and the base of the fingers where they join the arms also contact these walls. It will be observed from FIGS. 1 and 2 that the length of the arms is such that they extend substantially beyond the centerline of the fastener portion as shown in those figures.

At the center of the base or web of the fastener portion 11, an opening 15 is provided for the shank of a screw for anchoring the fastener to the base of the recess. The fastener portion 11 can be blanked from 0.035–0.070 steel strip or sheet stock as indicated by the blank pattern illustrated in FIG. 10. The thicker the stock, the more rigid will be the resulting joint. After it has been blanked and folded into the form illustrated in FIGS. 3 and 4, it can then be heat treated to give it the qualities of a spring. It can be initially formed by suitable equipment such as an eyelet machine or a fourslide machine. These are known techniques for manufacturing a part of this general type.

The male portion 20 of the fastener 10 can be formed on suitable equipment such as an eyelet machine from tubular stock to provide an elongated, tubular member having a closed end 21 and an open end 22. The closed end 21 is provided with a suitable opening to receive a screw 23. The sides of the tubular shell are formed into circumferentially spaced ridges 24 of a size and spacing such as to interfit with the fingers 14 and 14a of the fastener portion 11. The ridges are axially spaced by channels 25. The male portion 20 may also be integrally formed with the screw as by cold heading and forming the tubular head.

To effect a joint as previously stated, the female fastener portion 11 is seated in a circular recess 30 as indicated in FIG. 2. It is secured to the bottom of the recess by a suitable screw or the like 31. Preferably the screw has a broad head to provide positive resistance to rocking. In FIG. 1, the outer periphery of the ridges 24 and the base of the channels 25 of the male portion of the fastener are indicated in broken lines. It will be seen that the fingers of the fastener portion 11 intersect these lines.

The male fastener portion 20 is secured to the surface of the panel or structural element to be attached to the panel or structural element in which the fastener portion 11 has been inserted. This is done by securing the male portion 20 by the screw 23. When this is done, the portion 20 protrudes from the panel. The panels are then joined by inserting the fastener portion 20 between the fingers 14 and 14a of the fastener portion 11 in the recess of the panel having the female portion 11 therein. The relationship of the panels when they have been joined is schematically illustrated in FIG. 6 wherein the recess 30 is shown in one panel with the fastener portion 20 secured to the surface of the other panel.

As the panels are joined, the fingers 14 and 14a are forced outwardly and spread apart as indicated in FIG. 2. As a result, the fingers 14 and 14a at each end are forced against the walls of the opening 30 which results in an arching of the fingers and an inward bowing of the arms 13 and 13a. Since the fastener portions 11 have been heat treated to give them a spring-like quality, this results in a positive gripping of the fastener portion 20 by the fastener portion 11, locking the two together against axial separation and, because of the toggle-like effect of the bowed and stressed fingers, a firm, positive and effective joint is formed tightly securing the panels together and holding them against the normally expected loads which tend to separate the fastener portions. The fastener portion 11 acts as a cage which encloses and secures the fastener portion 20 in a secure friction fit. As will be appreciated, when the tubular element 20 is bottomed against the base or web 12 of the female portion 11, the tight fit between the head of screw 31 in the tubular element 20 centers and stabilizes the joint and axially aligns it.

FIGS. 7 and 8 illustrate a somewhat modified construction for this invention. In this case, the female portion 11a is modified by shortening the fingers or protrusions 14b and 14c so that they do not overlap and turning their end portions partially inwardly toward each other to form hooks 35 and 35a which snap into the channels 25 of the fastener portion 20. Once again, the fastener portion 11a is so designed that the juncture of the fingers 14b and 14c with the arms of the fastener are pressed against the walls of the opening 30. Thus, as the fingers 14b and 14c are forced apart by the insertion of the portion 20, the arms 13b and 13c are caused to arch inwardly, thus setting up a strong spring resistance to movement of the portion 20 in any direction.

FIG. 9 illustrates a modified form of the fastener portion 20. The modified fastener portion 20a, instead of being formed as a hollow tube, is manufactured as a solid head 40 on the threaded shank 41. The head is designed with axially spaced circumferential channels 42 to receive the fingers or hooks of the fastener portion 11 or 11a and has suitable means 43 such as a slot to receive a tool, for example, a conventional screwdriver. The modified fastener portion 20a can be formed by a suitable process such as cold heading or screw machine. Its function is exactly the same as the portion 20 illustrated in FIG. 5 and may be made tubular at its projecting end to cap or nest the screw 31 for alignment stability.

In the forming of the protrusions 14 and 14a in the arms 13 and in the modified form of hook ended protrusions 14c and 14b, the entire length or portions thereof may be upset as by serrations 51 on the edges and ends thereof as shown in FIG. 10 so that as the protrusions 14, 14a, 14b, and 14c are expanded by contact with the male element 20, the serrated portions along part or all of the length of the protrusions 14, 14a, 14b, and 14c have friction enhancing surfaces grabbing against the surface of the openings 30 and at the contact interfaces between the male elements 20 and the female elements 11. The extremities of the protrusions may be rounded as seen in FIG. 10.

In the FIG. 2, as contrasted with FIG. 1, upon insertion of the male element 20 into the female element 11, the outside diameter of the male element exceeds the rest diameter position of the protrusions 14 and thereby expands and distorts the protrusions 14 into tight perimeter contact with the confining walls of the opening 30. Thus, the diameter of the male element 20 at 24 and at 25 exceeds the contact diameter of the female element 11 at insertion. The outer surface 24 of the male element 20 is indicated for position in phantom line in FIG. 1 and in full line in FIG. 2.

Having described a basically inexpensive and positive blind fastener for joining a pair of panels, it will be recognized that various modifications of this invention can be made without departing from the principles thereof. Such modifications are to be considered as included in the hereinafter appended claims unless these claims expressly state otherwise.

I claim:

1. A fastener for interconnecting a pair of elements, said fastener having a male portion and a female portion, said female portion having a base and a plurality of upstanding arms integral with the base and extending normal thereto and sized to frictionally and radially engage the sides of a cylindrical recess provided in the face of one of said elements, each of said arms having a plurality of protrusions arranged crosswise of said arms, the protrusions being spaced along said arms, the protrusions of one arm extending toward the protrusions of the other of said arms, said male portion secured to the other of said elements and sized to seat telescopically between said arms in a selected friction fit, said protrusions of one arm also extending past the protrusions of the other arm whereby the ends of said protrusions thrust against said cylindrical recess and applying a radial force normal to the axis of said male portion thereof and holding said portions together.

2. A fastener as described in claim 1 wherein said male portion is generally tubular and has a base closing one end, said selected fit achieved by providing grooves in the form of a plurality of circumferential channels, said channels being spaced lengthwise of said portion.

3. A fastener as recited in claim 1 wherein the ends of said protrusions are rounded.

4. A fastener as recited in claim 1 wherein the ends of said protrusions are serrated.

5. A fastener as recited in claim 1 wherein said male portion is a screw having a cylindrical head at one end, said head having a length which is a major portion of the length of said arms and a diameter which is a major portion of the spacing between said arms, said head having an outer surface which is annularly upset over its length for frictionally engaging said protrusions.

6. A fastener as recited in claim 1 wherein said protrusions are elongated and extend a major portion of the distance between said arms, the pairs of protrusions on one arm being offset lengthwise of said arms from the protrusions on the other of said arms, said arms of each pair being curved to extend toward each other.

* * * * *